April 7, 1970     H. G. FALTIN ET AL     3,504,833
INSERTING MACHINE FOR HIGH SPEED WEB PRESSES AND THE LIKE
Filed May 12, 1967     7 Sheets-Sheet 1
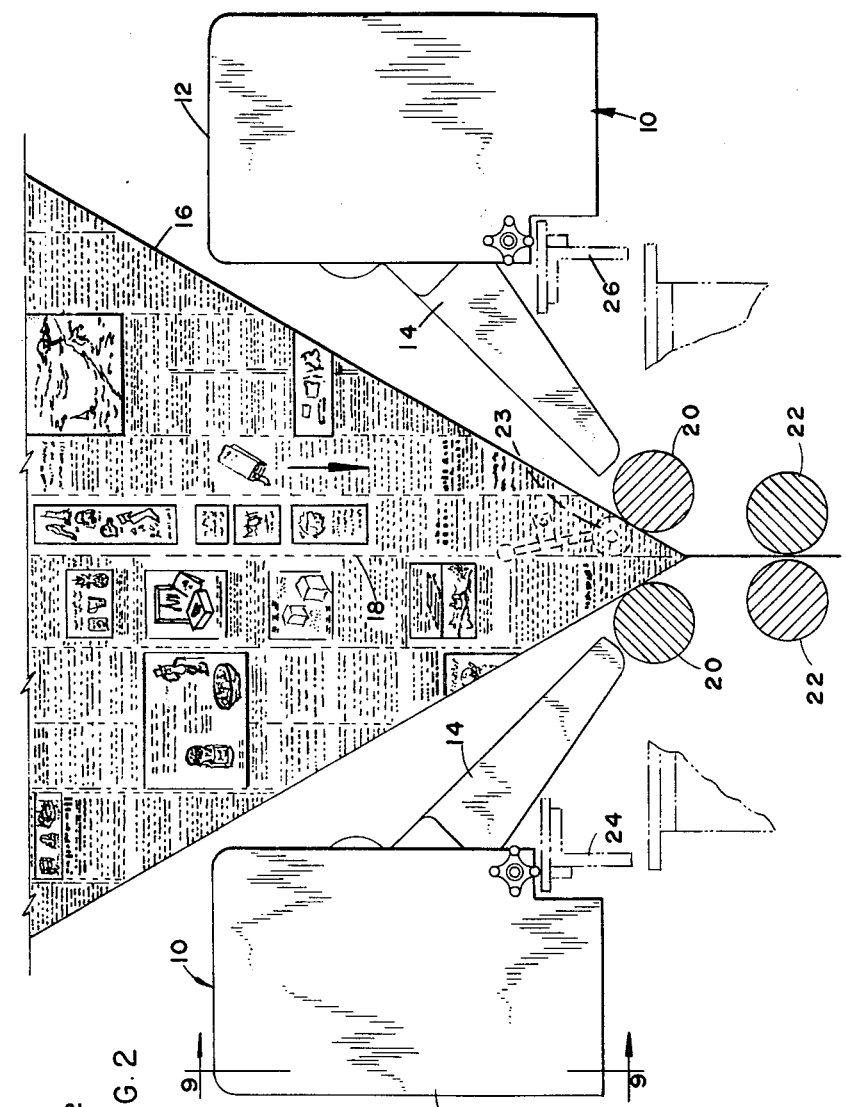
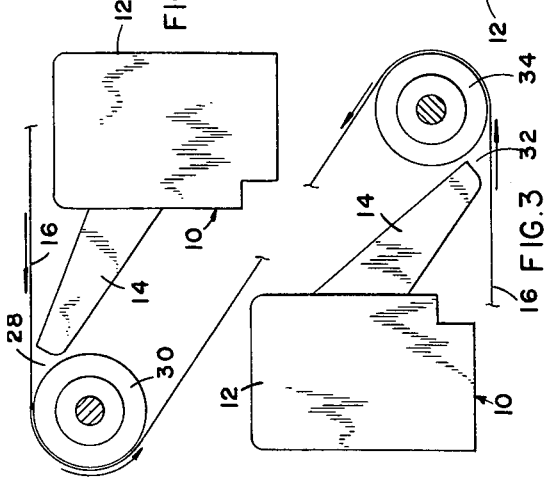
INVENTORS
HANS G. FALTIN
CARL A. SUTTON
BY
ATTORNEY

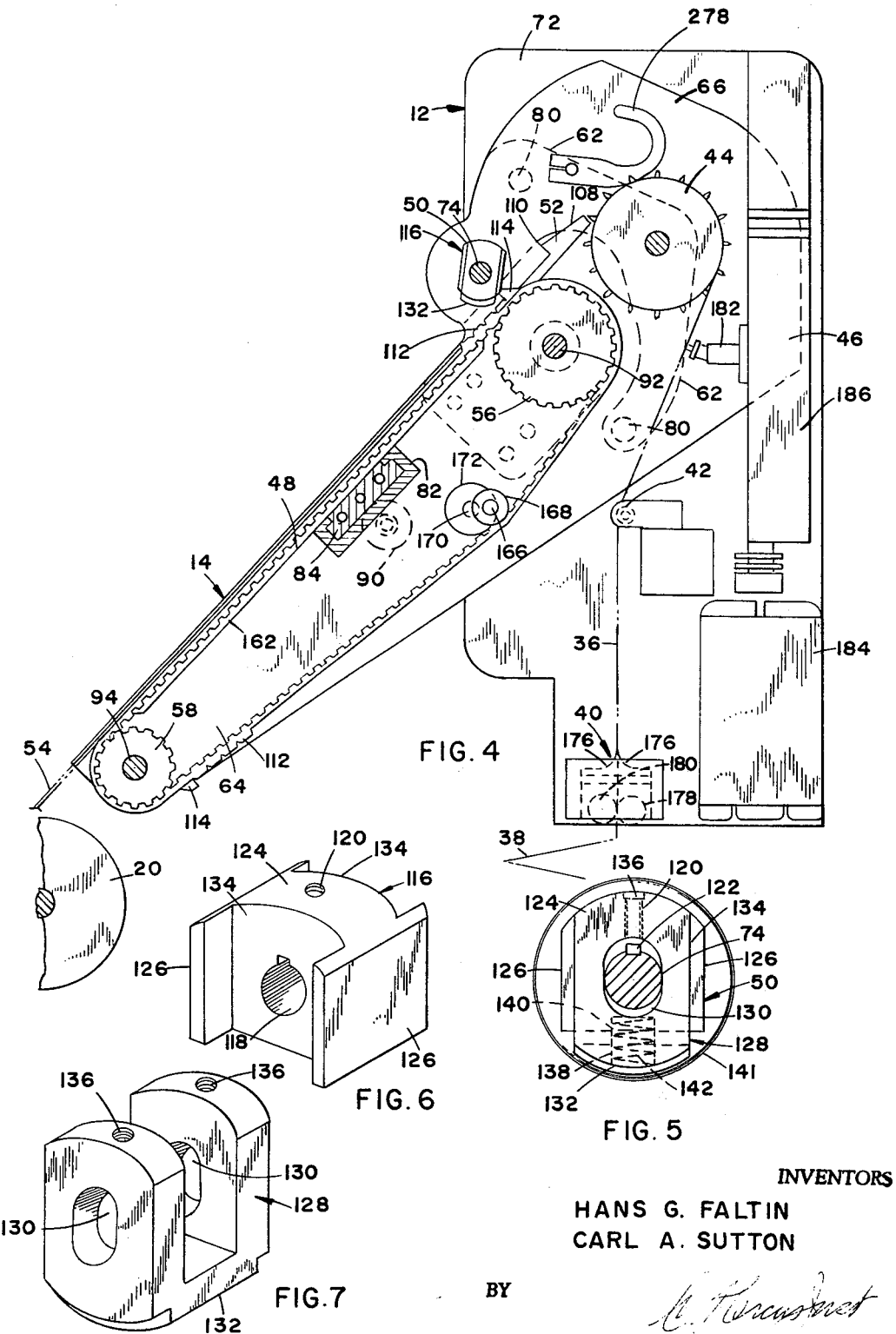

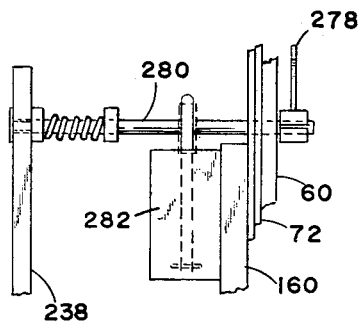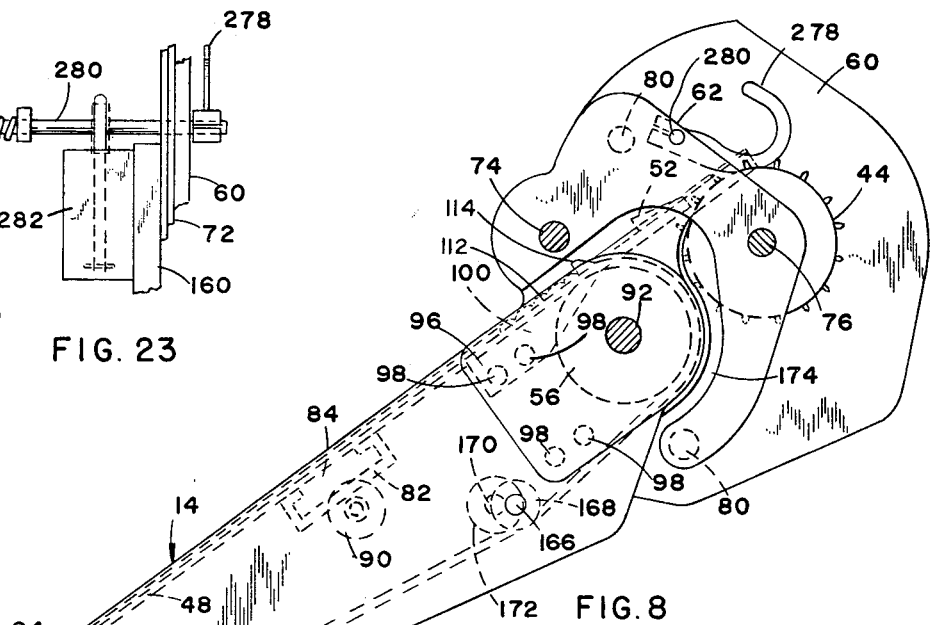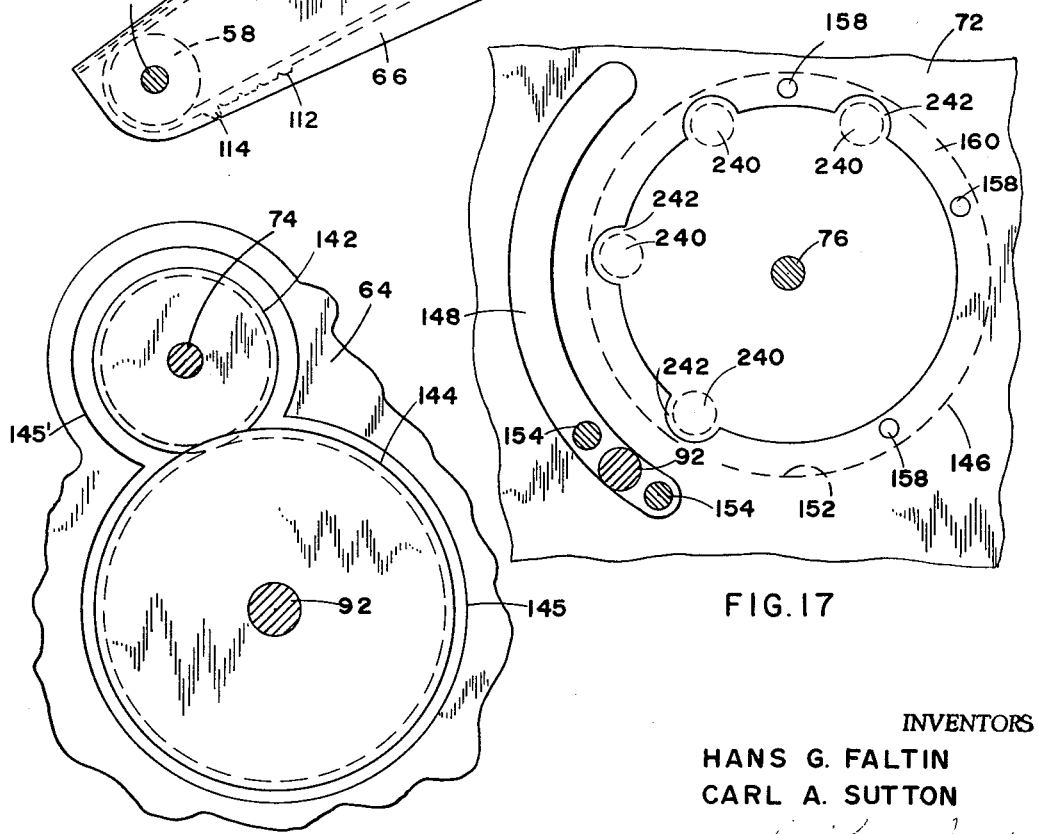

April 7, 1970   H. G. FALTIN ET AL   3,504,833
INSERTING MACHINE FOR HIGH SPEED WEB PRESSES AND THE LIKE
Filed May 12, 1967   7 Sheets-Sheet 4
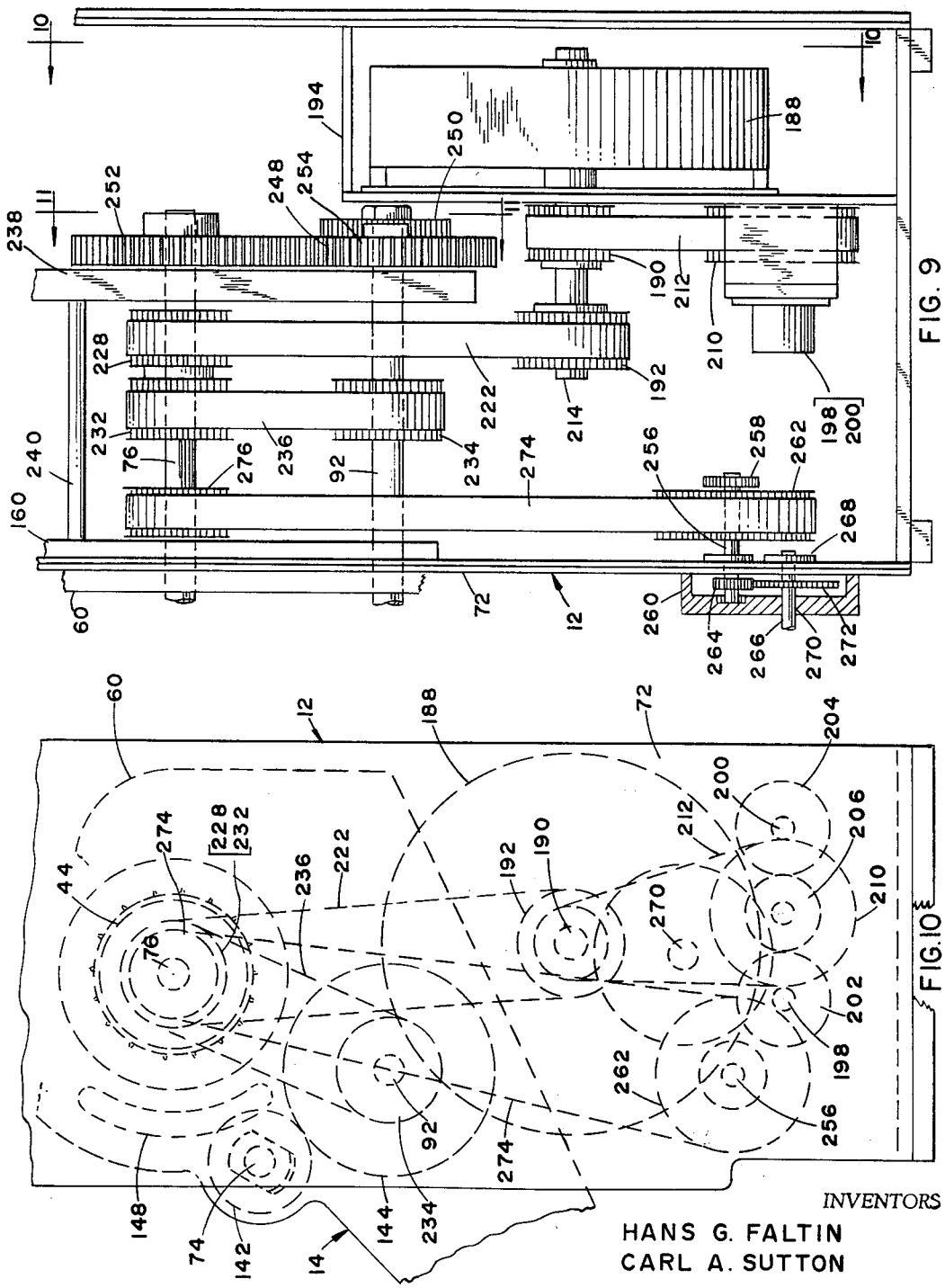
INVENTORS
HANS G. FALTIN
CARL A. SUTTON
BY
ATTORNEY

INVENTORS
HANS G. FALTIN
CARL A. SUTTON

BY

ATTORNEY

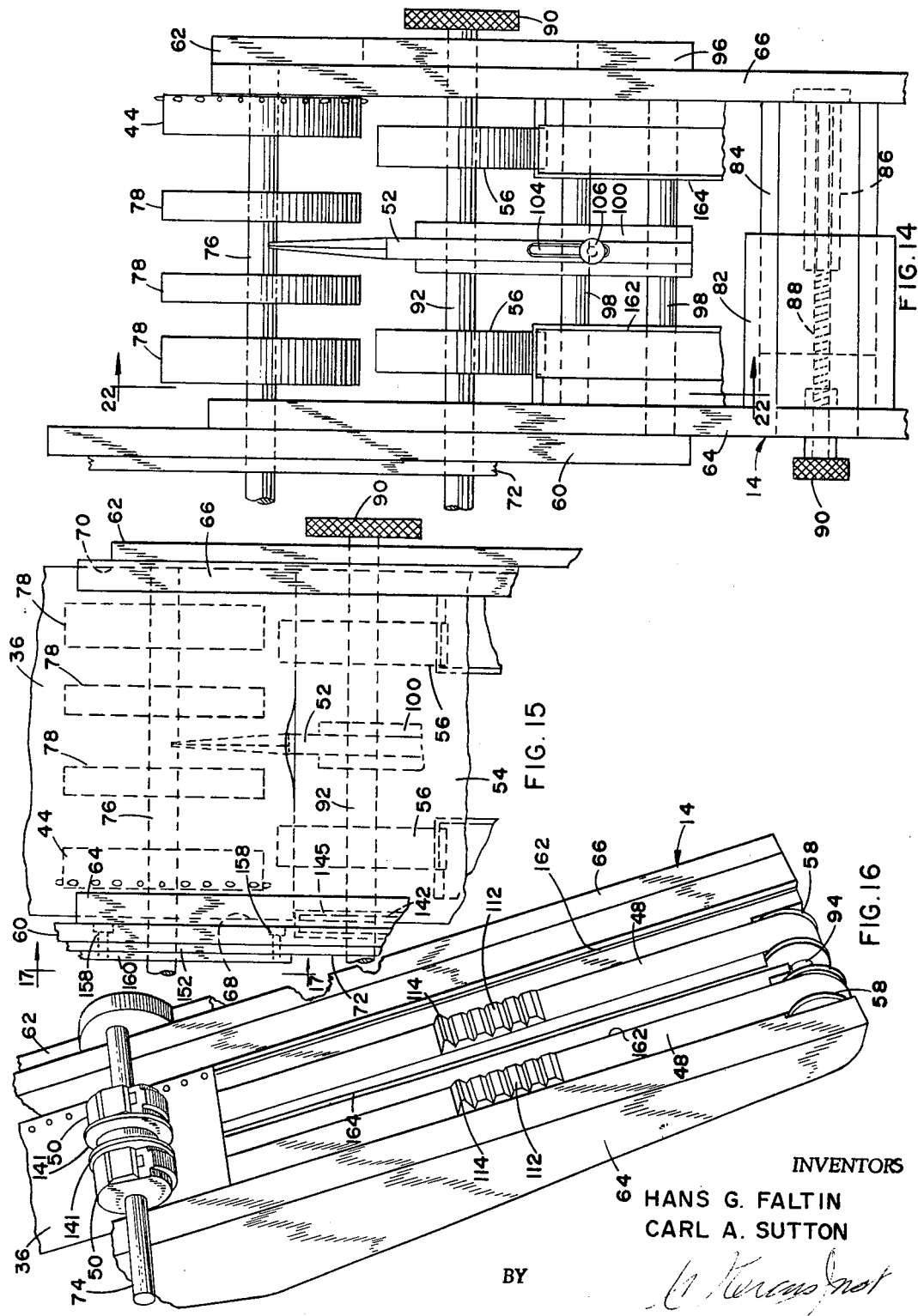

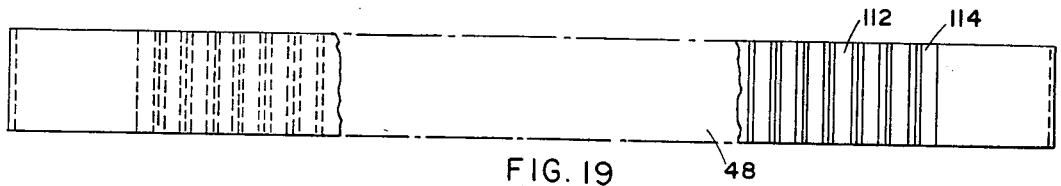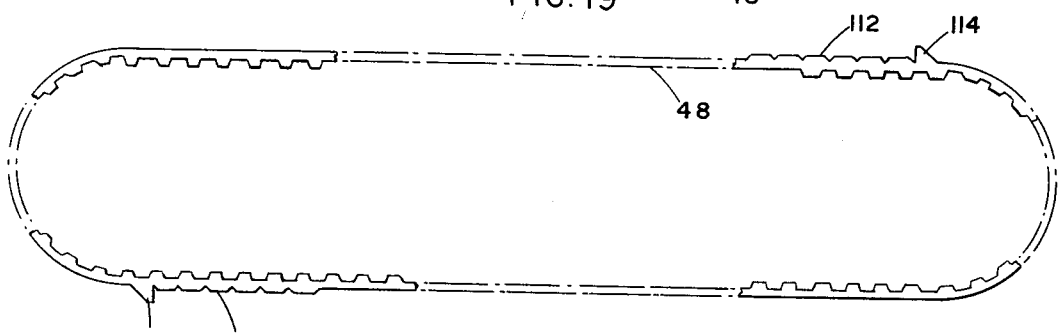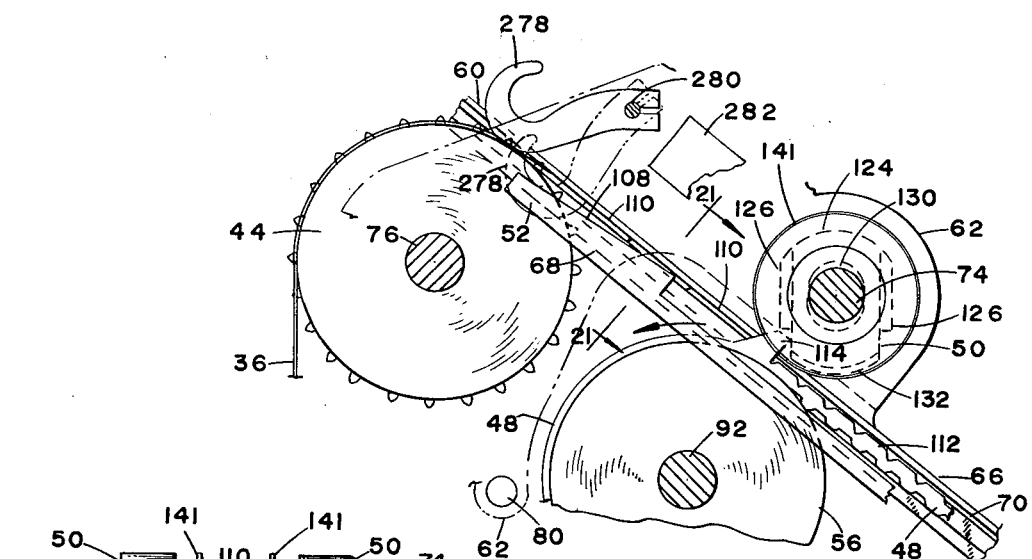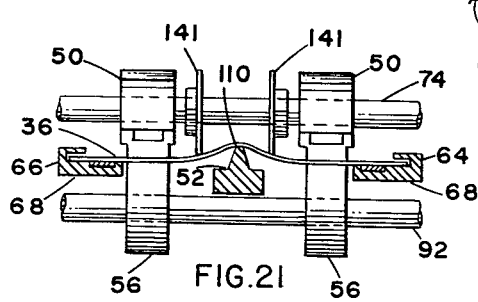

United States Patent Office 3,504,833
Patented Apr. 7, 1970

3,504,833
INSERTING MACHINE FOR HIGH SPEED WEB
PRESSES AND THE LIKE
Hans G. Faltin, 4135 Wilshire Drive 17802, and Carl
A. Sutton, 4281 Old Orchard Road 17803, both of
York, Pa.
Filed May 12, 1967, Ser. No. 638,019
Int. Cl. B65h 35/10
U.S. Cl. 225—97          29 Claims

ABSTRACT OF THE DISCLOSURE

A machine attachable to high speed web presses or other web processing machinery and operable to feed a strip of separable inserts, separate the leading one successively and feed it to a printed web for attachment thereto with adhesive, at a predetermined location.

BACKGROUND OF THE INVENTION

Modern advertising techniques increasingly require the attachment of coupons, reply cards, envelopes, and other types of inserts to printed magazines, newspapers, supplements, circulars and catalogs in indexed relation to printed ads therein. These inserts may be in the form of single thickness heavy paper or lightweight card stock, or multi-plies thereof in the form of a mailing envelope. Such inserts usually are separate pieces and require additional bindery operations, thus incurring additional costs in time and labor. However, if said inserts are arranged in continuous strip, zigzag folded, business form fashion in which the successive inserts are connected by weakening means, such as transverse perforations, they can be attached to the web, if printed, immediately after printing or processing as part of the same operation.

The machines presently available to achieve the foregoing purposes are cumbersome and complex. One principal disadvantage is that they must be mounted in direct contact with the web and generally at a location which requires the removal of the inserting machine to gain access to the press, such as when the web breaks, so as to rethread the web through the press. Web breaks occur fairly frequently, so that such removal is time-consuming and laborious. The separation of inserts by presently available equipment also is unrealiable and is not well suited to the high speed operations at which modern web equipment operates.

SUMMARY OF THE INVENTION

The principal object of the present invention is to provide a compact machine to feed and separate a strip of connected inserts and deliver the same successively to precisely located predetermined positions upon a web moving at very high speeds, said machine comprising a housing containing drive mechanism and regulating timing means to synchronize delivery of the separated inserts to the web at the speed thereof, and adjustably positioned discharge means for the separated inserts permit such delivery to a wide range of locations upon a web while moving through a printing press or other type of processing machine incident to the web being folded, sheeted, or otherwise being processed, all without interference with ready access to the web such as while rethreading the same.

The feeding and separating means for the strip of inserts is extremely simple yet highly versatile in permitting wide variations in speed to suit the speed of the web, as well as insuring constant orientation of delivery of the inserts to the web, automatically.

The successive separation of the leading insert from a strip thereof is accomplished positively by pulling the leading insert at a much faster speed than the feed means past a rupturing member and after separation, the discharge likewise is positive due to the provision of pushing means which engage the separated inserts and positively propel them, at controlled high speed, until they exit from the discharge means, with adhesive applied thereto, for immediate attachment to the web of a predetermined location.

DESCRIPTION OF THE DRAWINGS

FIG. 1 is a side elevation of an inserting attachment for feeding and separating strips of inserts in accordance with the principles of the present invention, said attachment respectively being shown mounted on opposite sides of the former or delivery end of a printing press and from which a printed web is shown fragmentarily in process of being formed incident to inserts being affixed to certain surfaces of said web.

FIGS. 2 and 3 respectively are exemplary, fragmentary side elevations representing additional possible locations of such an inserting attachment as illustrated in FIG. 1 but positioned with respect to other locations of a web moving through a printing press or other type of processing machine.

FIG. 4 is a vertical sectional elevation through the inserting attachment of the type illustrated in FIGS. 1–3 and illustrating particularly the means for feeding, severing or separating, and pulling or bursting mechanism by which successive leading inserts are separated from a strip thereof at high speed, said illustration also showing exemplary adhesive-applying means.

FIG. 5 is an enlarged side elevation of one of the pressure or bursting members illustrated in FIG. 4.

FIGS. 6 and 7 respectively are perspective exploded views of the two principal components of the composite members shown in FIG. 5 to illustrate details of the same.

FIG. 8 is a view similar to FIG. 4 but showing principally the frame means by which the bursting, pulling and delivery mechanism is mounted with respect to the feeding means for a strip of inserts.

FIG. 9 is a vertical elevation substantially taken on the line 9—9 of FIG. 1 and showing details of the drive and transmission mechanism mounted within the housing which supports the frame structures shown principally in FIGS. 4 and 8.

FIG. 10 is a vertical sectional elevation substantially taken on the line 10—10 of FIG. 9 and illustrating diagrammatically the principal elements of the drive mechanism shown in FIG. 9 and illustrating the transfer of power from one means to another.

FIG. 14 is an enlarged fragmentary front view of the upper portion of the feed and bursting or separating mechanism shown in FIGS. 4 and 8.

FIG. 15 is a fragmentary illustration of a portion of the mechanism shown in FIG. 14 but illustrating a reverse arrangement of the feeding means from that shown in FIG. 14.

FIG. 16 is a perspective view of the bursting or separating and delivery means of the mechanism generally illustrated in FIGS. 4 and 8.

FIG. 17 is a fragmentary side elevation of clamping mechanism for the supporting frame for the feeding, separating or bursting, and pulling or delivery means shown in FIG. 15 as seen on the line 17—17 of said figure but on a larger scale than employed therein.

FIG. 18 is a fragmentary vertical sectional elevation showing details of a part of the driving mechanism.

FIGS. 19 and 20 respectively are a plan view and a side elevation of an exemplary belt comprising part of the bursting and delivery mechanism.

FIG. 21 is a fragmentary transverse sectional view as seen on the line 21—21 of FIG. 22 and showing part of the rupturing or bursting structure for separating successive inserts from a strip thereof.

FIG. 22 is a fragmentary side elevation as seen on the line 22—22 of FIG. 14 and showing further details of the feeding, bursting or severing, and pulling mechanism.

FIG. 23 is a fragmentary front elevation of safety mechanism associated with the web feed to stop the machine in the event of web depletion or breaking.

DESCRIPTION OF THE PREFERRED EMBODIMENTS

Figure 11:
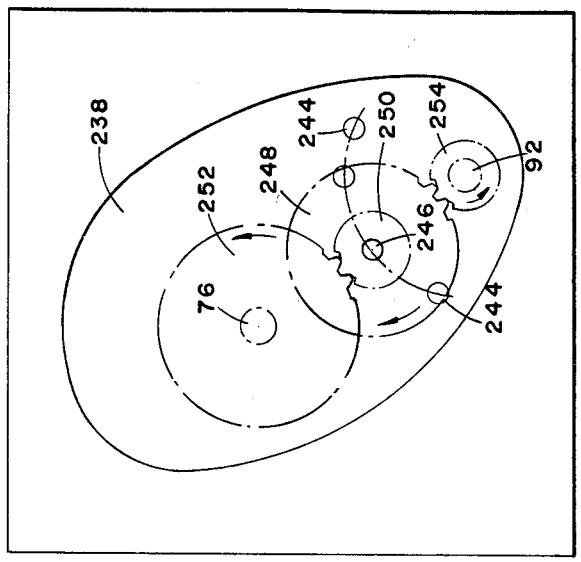
FIG. 11 is an exemplary side elevation as seen on the line 11—11 of FIG. 9 and showing an arrangement of transmission gears illustrated in FIG. 9.

To facilitate a ready understanding of the details and functions of the mechanism comprising the present invention, the following description has been presented in sections or areas pertaining respectively to certain localized portions of the mechanism, most of which have specific functions. To orient such descriptions, however, the following general, overall description is set forth.

BASIC MECHANISM

The inserting attachment which embodies the principles of the present invention is applicable to high speed web presses and processing machines and may be mounted upon the frame of said machines for support thereby at any one of a number of locations, certain of which are suggested in exemplary manner in FIGS. 1-3. In these views, the inserting attachment 10 comprises a housing 12, preferably formed from suitable metal plates, and an adjustably positionable delivery chute 14 which is connected to one side of the housing 12 by clamping means to secure the delivery chute 14 in any desired angular position within the possible limits of movement. Referring to FIGS. 2 and 3, the upper and lower limits of such adjustable movement of the chute 14 with respect to housing 12 are illustrated in exemplary manner, especially to show the versatility of the attachment. In view of such possibilities, the attachment may be mounted at any one of a number of suitable locations on a high speed web press or processing machine as long as the location is such that delivery of separated inserts by the attachment occurs at a location on the web after the same has been printed or otherwise processed.

Referring to FIG. 1, a portion of the frame of an exemplary high speed web press has been selected to specifically illustrate the invention but it is to be understood that the invention also is applicable to other types of web processing machines in which inserts are attached to such webs. The insert attachment 10 is illustrated in FIG. 1 in fragmentary manner adjacent the delivery or former end of the same. In said figure, the printed web 16 is shown as moving in the direction of the arrow illustrated thereon for purposes of forming the printed web along a longitudinal line 18, the forming being controlled by a pair of conventional forming rollers 20 and the partially folded web then passes between a pair of nip rollers 22.

It is to be understood that the illustration of the attachments 10 respectively adjacent right-hand and left-hand sides of the delivery or forming end of a high speed web press is merely exemplary and not to be regarded as restrictive. However, these locations on the press are highly advantageous for using said attachment which is arranged to be secured, for example, to suitable frame portions 24 and 26 of a conventional high speed web press.

Referring to FIG. 2, another exemplary possible location of the attachment 10 with respect to the printed web 16 is shown, wherein it will be seen that the adjustable chute 14 which comprises the delivery means for the separated inserts to be attached to the web 16 is disposed upwardly and outwardly and thereby projects the inserts into the exemplary nip 28 between a guide roller 30 on the press when the web is moving around the same in the direction of the arrows shown in said figure. It will be understood that the inserts delivered by the attachment 10 are fixed to the printed web by pressure exerted between the web and a suitable rotating pressure surface such as that offered by a forming roller, nip roller, or guide roller, but without restriction thereto. If desired, a suitable backing roller 23 may be mounted so as to exert pressure against the surface of web 16 in opposition to one of the rollers 20.

To illustrate a further possibility, it will be seen in FIG. 3 that the adjustable delivery chute 14 is directed outwardly and downwardly for delivery of the separated inserts into the nip 32 which occurs between the moving web 16 and another exemplary guide roller 34, for example, while the web moves in the direction of the arrows shown in FIG. 3. The purpose of the illustrations in FIGS. 2 and 3 is to show the possibility of delivering inserts for attachment to the printed web at substantially any desired location on the web, regardless of whether the predetermined location thereon occurs on a sheet or page which ultimately will be disposed on the interior of a magazine or newspaper supplement, for example. Such possibilities thereby distinguish over the exemplary illustration in FIG. 1 wherein the attachment of the inserts to a folded printed web presupposes primarily that the same will constitute either the cover sheet of an exemplary magazine or the center fold thereof. Accordingly, the attachment comprising the present invention is capable of attaching inserts substantially to any location on a printed web, regardless of where the page or sheet to which the insert is attached ultimately is disposed at any location within a magazine, newspaper supplement, or the like, as long as the web has been printed.

Although it is intended that the attachment shall provide limited reversible possibilities of certain elements, details of which are described hereinafter, it is to be recognized that under certain circumstances where the adjustable chute 14, for example, is more convenient if located either on the left-hand or the right-hand side of the housing 12, the attachment initially will be constructed at the factory in accordance with the position of the adjustable frame with respect to the housing, as ordered by the customer.

Referring to FIG. 4, the path of travel of a strip of connected inserts through the attachment is illustrated in diagrammatic manner. The exemplary strip of inserts 36 may comprise printed coupons, cards, envelopes or otherwise, respectively formed on either heavy paper stock, light card stock, or any other type sheet material and connected at the ends thereof by weakening means such as a transverse row of perforations. Such inserts may be either of a single thickness such as when comprising a coupon or card, or they may be of multiple thickness, such as when comprising an envelope. Frequently, the same comprise a weakened portion which may be suitably separated by tearing from the insert, many of these inserts being for return-mail purposes and are associated with appropriate advertisements appearing on the printed web such as where the same comprises a part of a magazine, newspaper supplement, or otherwise. The strip of connected inserts may be arranged in roll form or any other suitable disposition such as the presently popular zigzag, folded configuration and stacked in such condition in an appropriate carton, a single carton frequently containing many hundreds of such connected inserts.

In FIG. 4, the exemplary strip 36 of connected inserts is shown being led from the exemplary zigzag arrangement 38 through a drag unit 40 to place tension thereon and, from there, past a guide roller 42 and around a pinwheel type feed roller 44, said strip passing an adhesive-applying unit 46 during such movement. The feed roller 44 engages a series of holes formed, for example, in one edge of the strip of inserts to insure positive feeding thereof at a predetermined speed controlled by the guide means for the feed roller 44, details of which are described hereinafter. The adjustable chute 14 supports, preferably, a pair of flexible friction belts 48 which comprise pulley means. Associated with the same are a suitably spaced pair of pressure or bursting rollers 50 which positively move the leading insert of the strip 36 thereof past a fixed rupturing blade 52 which initiates separation of such leading insert from the strip thereof along the weakening means such as a transverse row of perforations, serrations, or the like.

The pulley means comprising belts 48 are operated at a predetermined speed substantially higher than that of the surface speed of the feed roller 44. Thus, at the proper instant, such leading insert is subjected to a quick, firm and positive jerk which produces instant separation thereof and rapid movement along the chute 14. The separated insert is positively pushed down the chute by appropriate means on the belts 48 until the severed or separated inserts 54, shown in the lower portion of FIG. 4, exit from the outer, discharge end of the pulley means for delivery to a predetermined location upon the moving printed web 16.

The pulley means comprising the belts 48 extend around appropriate timing pulleys 56 and 58 which preferably are of the type affording positive connection with the inner surface of the belt, such as by complementary, transverse lugs and grooves.

Pulley 56 is driven at a predetermined speed by suitable drive and transmission mechanism contained within the housing 12, details of which are described hereinafter.

It thus will be seen from the foregoing that the relatively simple mechanism comprising the essential components and elements of the inserting attachment 10 is of such nature that it is fully capable of delivering seperated inserts at speeds substantially greater than those at which modern high speed web presses and other forms of web processing machines operate at the present time. For example, the maximum speed of presses currently used is in the range of approximately 60,000 impressions per hour. Test runs of attachments embodying the principles of the present invention have been conducted at speeds delivering separated inserts satisfactorily for sustained periods of time at a rate substantially in excess of 120,000 cards per hour. Further, the inserting attachment comprising the invention is compact, relatively small, and capable of being mounted upon high speed web equipment at various locations without interfering with access to the web, particularly when a break occurs and rethreading of the web is required.

FEEDING, PULLING AND SEPARATING MECHANISM

The feed roller 44, pulling belts 48 and the timing pulleys supporting the same, bursting rollers 50, and rupturing blade 52 are all carried by the adjustable chute 14. Said chute and the elements carried thereby are movable between an upwardly angled position shown in exemplary manner in FIG. 2 and a downwardly angled position shown in exemplary manner in FIGS. 1, 3, 4 and 8, such range of movement subtending an angle of approximately 70°, thus affording wide latitude of delivery direction. Such angle is not to be regarded as restrictive, however, but merely illustrative.

The chute 14 comprises a pair of outer plates 60 and 62 which may be referred to as swing plates. These respectively are connected to, but are shorter than, the side plates 64 and 66 which respectively contain guide channels 68 and 70 that slidably receive the opposite edges of the strip 36 of inserts as well as the separated leading insert 54.

The swing plate 60 is of irregular configuration, as can readily be seen from FIGS. 4 and 8, and flatly engages the side plates 72 as best shown in FIG. 15 wherein said plate is shown fragmentarily.

In FIGS. 4 and 8, it will be seen that the outermost swing plate 62 is somewhat crescent-shaped and primarily is for purposes of supporting bearings for shaft 74, upon which the bursting rollers 50 are mounted, and shaft 76 which supports the pinwheel 44 as well as a number of additional guide rollers 78, see FIG. 15, of the same diameter as pinwheel 44 and around which the connected strip 36 of inserts are fed for engagement with the rupturing blade 52. The outer swing plate 62 is spaced transversely from the opposite swing plate 60 of sufficient distance to support all of the remaining elements of the adjustable chute 14 therebetween as can be seen particularly from FIGS. 14 and 15. A pair of transversely extending supporting shafts or bars 80, best shown in FIGS. 4 and 8, are fixed respectively at their opposite ends to the inner faces of the swing plates 60 and 62 and such arrangement provides a rigid structure.

Side plate 64 is fixed firmly to the swing plate 60 by suitable bolts. The opposite side plate 66, however, is transversely movable toward and from the side plate 64 for purposes of varying the width therebetween and thus accommodate the guide channels or grooves 68 and 70 respectively in said side plates to support and guide a strip of inserts, as well as separated individual inserts of any required width within reasonable limits. To permit such transverse adjustment of side plate 66 with respect to side plate 64, attention is directed to FIGS. 4 and 14 in particular, wherein it will be seen that a pair of interfitted, longitudinally extendible guide blocks 82 and 84 respectively are fixed at their outer ends to guide plates 64 and 66 by appropriate cap screws or the like.

From FIG. 4, it will be seen that there is a somewhat squared dove-tail interfitting relationship between the two guide blocks to permit relative longitudinal movement but the sliding engagement between the associated surfaces of said blocks is preferably quite precise so as to minimize any undesired play between the two blocks. This affords relatively precise parallel arrangement between the opposite side plates 64 and 66 regardless of the transversely adjusted position of the same with respect to each other incident to accommodating the guide channels therein to inserts of different widths. Such transverse adjustment between the side plates is effected by an appropriate internally threaded rod 86 which is engaged by the threaded shaft 88 having an actuating knob 90 on the outer end thereof. The threaded shaft 88 is rotatably but non-axially movable with respect to the side plate 64, while the internally threaded rod 86 is fixed relative to side plate 66.

Opposite end portions of the side plates 64 and 66 are provided with suitable antifriction bearings respectively to support the opposite ends of shafts 92 and 94 which respectively support the pairs of timing pulleys 56 and 58 around which the friction belts 48 extend. In this regard, the bearing supported by the transversely movable side plate 66 which receives the corresponding end of shaft 94 of the timing pulley 58 is slidable with respect to said shaft to permit such transverse adjustment of the side plate 66 relative to side plate 64. However, as can be seen from FIG. 8, an additional supporting plate 96 is fixedly positioned exteriorly of the outer surface of side plate 66, the same supporting an antifriction bearing in its uppermost end portion as viewed in FIG. 8 for fixedly receiving the adjacent end of the shaft 92. Supporting plate 96 is fixedly connected to the side plate 64 by a plurality of fixed shafts 98 which are connected at their ends firmly to the inner surfaces of guide plate 64 and supporting plate 98, such shafts 98 being illustrated somewhat diagrammatically in FIG. 8.

The pairs of timing pulleys 56 and 58 respectively are fixed to the shafts 92 and 94 in desired spaced relationship axially thereof. When the outer side plate 66, for example, is transversely adjusted with respect to the opposite side plate 64, especially where such adjustment is of a substantial nature, it will be preferred to axially position one of the timing pulleys 56 and 58 of each pair upon their respective shafts at a different location commensurate with the width of the insert to be accommodated between the guide channels 68 and 70 in the side plates.

Supported by the uppermost pair of fixed shafts 98, as can be seen from FIGS. 8 and 14, is a base member 100, the upper surface of which is parallel to the path of movement of the upper course of the belts 48. The base member 100 supports the elongated rupturing blade 52, which is provided with a longitudinally extending slot 104 through which a suitable clamping bolt of screw 106 extends for purposes of securing the rupturing blade 52 in a desired longitudinal relationship not only with respect to the base member 100 but particularly the location at which the weakening means between adjacent, connected inserts is initially to be ruptured incident to completely severing or separating the leading insert 54 from a strip 36 thereof.

The severing blade 52 is best illustrated in FIGS. 4 and 22, wherein it will be seen that said blade has an inclined surface 108 which extends at a very acute angle to the longitudinal axis of the blade and terminates at an elevation above the normal plane of movement of a strip of inserts as guided around the pin-type feed wheel 44 for subsequent substantially straight movement within the guide channels 68 and 70, as can be seen from FIG. 22. The sloping surface 108 terminates in an abrupt angular projection 110 which effects initial rupturing of the weakened connection between a leading insert 54 and the next adjacent one in the strip 36 thereof, as diagrammatically illustrated in FIG. 15.

The initial rupturing of the leading insert 54 from a strip thereof and instantaneous complete separation of the same from said strip is accomplished by pulling means partially comprising the pair of belts 48, which extend around the timing rollers 56 and 58. It will be seen that at spaced circumferential locations upon the belts 48, thickened portions 112 are provided for short distances, terminating at the trailing ends thereof in projections 114 comprising positive pusher elements which engage the trailing ends of severed inserts and propel the same along the guide channels 68 and 70 at predetermined, positive speeds. Such pushing movement continues to the exit end of the guide channels, as illustrated diagrammatically in exemplary manner in FIG. 4.

The belts 48 preferably are made of suitable flexible, frictional material such as rubber and the inner surfaces thereof are formed with transverse grooves which receive transverse complementary lugs upon the peripheries of the timing rollers 56 and 58, such structure being illustrated in exemplary manner in FIG. 4. The timing rollers 56 are keyed to the drive shaft 92 which supports the same, said shaft being revolved at a precise predetermined speed which is positively transmitted to the pulling means comprising the belts 48.

After the leading insert of the strip 36 thereof has been moved around the feed roller 44 and the adjacent guide rollers 78 of similar diameter and has been projected a short distance into the entrance ends of the guide channels 68 and 70 adjacent said rollers, the leading insert is somewhat elevated at its mid portion from its normal plane between said channels by engagement with the terminal extremity 110 of rupturing blade 52, in the manner as diagrammatically illustrated in FIG. 21. The movement of the belts 48 is so arranged when this occurs that one of the thickened portions 112 of said belts is moving around the upper portion of the timing pulleys 56 in position to engage the lower surface of such leading insert. The speed of movement of such belts is substantially in excess of that of the speed at which the insert is being advanced by the feed roller 44, the pins of which respectively are engaging complementarily spaced holes in one edge of the strip of inserts not only to insure positive feeding thereof, but to prevent any variation in said feeding speed incident to the leading end of the strip of inserts being engaged by the more rapidly moving belts 48.

At the time one of the thickened portions 112 of the belts 48 is moving into engagement with the lower surface of the lower insert as aforesaid, additional parts of the aforementioned pulling means comprising pressure or bursting rollers 50 play an important function. Attention is directed to FIGS. 5 and 6 in which the details of said rollers are illustrated and wherein it will be seen that each of said rollers is composite and comprises a fixed portion 116 having a hole 118 therethrough which is complementary to the shaft 74 and to which the member is fixed such as by a suitable set screw mounted in the tapped set screw hole 120 and which is threaded into engagement with the shaft 74 or to a key 122 which preferably is mounted within complementary grooves formed in said shaft and fixed portion 116 to secure said portion fixedly to the shaft 74. Said fixed portion has an outer surface 124 comprising a segment of a cylinder which is coaxial with the axis of shaft 74.

The fixed portion 116 also has opposed parallel outer surfaces 126, the central portions of which are positioned a distance from the axis of shaft 74 which is less than the radius of the cylindrical surface 124, thus providing so-called relieved surfaces. The radial dimension of such relieved surfaces 126 with respect to the axis of shaft 74 is such as to permit the accommodation of the outermost surfaces of projections 114 on the belts 48 and thereby permit the projections 114 to move past the rollers 50 during the relative rotation of the shafts 92 and 74 which respectively support said moving elements, somewhat as illustrated in FIG. 4.

The other principal portion of each of the bursting rollers 50 comprises a U-shaped portion 128. The legs thereof are parallel and respectively include similar elongated slots 130, the width of which is complementary to the shaft 74 and through which said shaft extends. The bight portion 132 has an arcuate exterior surface also comprising a segment of a cylinder similar to the outer surface 124 of fixed portion 116. Preferably, the outer surface on bight portion 132 is of a reduced width corresponding to the width of the belts 48. The legs of member 128 closely and slidably fit within rectangular grooves 134 respectively formed in the opposite sides of fixed portion 116.

The terminal ends of the legs of member 128 are threaded in an axial direction through the same and intersect slots 130 for reception of set screws 136. The opposing surfaces of the bight portion 132 of member 128 and fixed portion 116 respectively are provided with complementary sockets 138 and 140 which receive the opposite ends of a compression spring 142 which normally urges the outer surface of bight portion 132 away from the shaft 74. The inner ends of the set screws 136 in the outer ends of the legs of member 128 are adjusted to engage the shaft 74 to limit the movement of the outer surface of bight portion 132 away from said shaft. By such arrangement, as can be seen from FIG. 4, the arcuate outer surface of bight portion 132 is the active means which cooperates with the thickened portions 112 of the belts 48 to comprise cooperative opposed pressure members or means, the opposing surfaces of which are moving at the same surface speeds.

Said speeds are substantially in excess of that at which the strip of inserts is being advanced at a steady rate by the feed roll 44. Such greater speed of the pressure members and the limited engagement thereof with the leading insert 54 results in quickly jerking the leading insert from the remaining strip of inserts, whereby as the weakening means which connects the leading insert with said strip is ruptured by passing over the rupturing extremity 110 of the rupturing blade 52, instantaneous separation of said leading insert along said weakening means from said remaining strip of inserts occurs.

The associated positions of all of the cooperating members described immediately above is such that as such severing or separation of the leading insert occurs, the trailing end thereof also is immediately abuttingly engaged by the projections 114 which positively propel the same along the guide channels 68 and 70, at a uniform predetermined high speed to the exit end of the guide channel which is at the terminal outer end of the adjustable chute 14. The relieved sides 126 of the pressure or bursting rollers 50 is oriented with respect to the projecting pusher members 114 so as to accommodate the same when the same moves around the timing rollers 56 in relation to the relative movement of the bursting rollers 50, as illustrated in exemplary manner in FIG. 4. Also, to further control the movement of the inserts while moving relative to bursting rollers 50, a pair of circular control discs 141 are fixed to shaft 74 between the rollers 50 and of suitable diameter to engage the inserts especially when the relieved portions of rollers 50 are opposite the inserts, thereby preventing flutter thereof.

The bursting rollers 50 and timing rollers 56 are moved in fixed relationship with respect to each other, so that the surface speeds thereof are the same, by intermeshing gears 142 and 144, best shown in FIG. 18, which respectively are fixed, such as by set screws or keys, respectively to shafts 74 and 92. The gears 142 and 144 preferably are of relatively simple, spur-type and are thin so as readily to be accommodated within complementary, shallow recesses 145 and 145′, somewhat of a figure 8 configuration, and respectively formed in the adjacent faces of side plates 64 of chute 14 and spring plate 60 which is fixedly connected thereto. An edge view of such arrangement is shown in exemplary manner in FIG. 15. The shaft 92, which drives the shaft 74 through the medium of gears 142 and 144 is, in turn, driven at a predetermined speed by transmission mechanism within the housing 12 and described hereinafter. Similarly, the shaft 76 which drives the feed roller 44 is driven by suitable means within said transmission in housing 12.

The chute 14 and all of the mechanism carried thereby which has been described immediately hereinabove is pivotally supported for swinging movement with respect to housing 12, such movement occurring about the axis of shaft 76 which drives the feed roller 44. This mounting is best shown in detail in FIG. 17 and comprises a circular bearing opening 146 formed in side plate 72 of housing 12. Coaxial with opening 146 is an arcuate slot 148 within which shaft 92 is movable as chute 14 is swung about the axis of shaft 76. Rotatable within the bearing opening 146 is a circular rotary bearing plate 152. Side plate 72 has fixed thereto a pair of short circular lugs 154 fixed thereto adjacent the opposite sides of shaft 92 and movable within slot 148 and engageable with the opposite ends of slot 148 to limit the maximum extents of movement of chute 14 about the axis of shaft 76 which extends through a suitable opening centrally within the rotary bearing plate 152. Said bearing plate is slightly thinner than side plate 72 within which the bearing opening 146 is formed for clamping purposes to be described.

A series of circumferentially spaced clamping bolts 158 are threaded through appropriate holes in the bearing plate 152 adjacent the periphery thereof, as seen from FIG. 17, said clamping bolts also being threaded into similar tapped openings in circular clamping plate 160 which engages the opposite side of side plate 72 of housing 12 from that which is slidably engaged by the swing plate 60. Accordingly, when the clamping bolts 158 are loosened, the chute 14 may be pivotally moved about the axis of shaft 76. When a desired angular position of the frame is reached relative to the supporting housing 12, the clamping bolts 158 then are tightened and the adjustable chute 14 thereby is clamped securely relative to the adjacent side wall of housing 12 for discharge of separated inserts 54 successively from said chute.

To insure guided longitudinal movement particularly of the uppermost courses of the belts 48 with respect to the chute 14, and especially to insure pushing engagement of the projections 114 of belts 48 with the trailing ends of separated inserts 54 during the entire path of movement thereof along chute 14, said chute is provided with elongated belt guides 162 and 164 which extend between the upper peripheral portions of the timing rollers 56 and 58 as can be best seen from FIG. 16. Such guides preferably comprise flat shallow grooves in the upper surfaces of elongated plates which respectively receive the lower portions of said upper courses of the belts 48. The guide plates preferably are supported by being fixed to the inner surfaces of the side plates 64 and 66 of chute 14.

For purposes of operatively mounting the belts 48 with respect to the timing rollers 56 and 58, the chute 14 is provided with belt-tensioning means, details of which are best illustrated in FIGS. 4 and 8. Referring to said figures, the side plates 64 and 66 respectively are provided with threaded holes 166 in axial alignment with each other for purposes of rotatably securing a disc 168 against the inner surface of each side plate. The discs 168 each have a short supporting shaft 170 fixed thereto adjacent the periphery thereof, the same rotatably supporting an idler timing pulley 172 which engages the lower course of the belt 48 associated therewith.

A headed clamping bolt extends through a central opening in disc 168 and is received in the tapped hole 166 in each side plate. By adjusting the disc 168 rotatably about the axis of said clamping bolt, the supporting shaft 170 for the idler pulley 172 is moved somewhat in the manner of a crank pin and causes varying degrees of tension to be imposed upon the belt 48 engaged thereby. When the desired amount of tension is produced by such adjustment of the idler pulley 172, the clamping bolt is tightened against the disc 168.

The tensioning means for the belt 68 described immediately hereinabove comprise not only means for tensioning the belts when mounted upon the timing pulleys 56 and 58, but they also comprise the means for loosening the same to effect mounting and dismounting of the belts with respect to said timing pulleys. Such mounting and dismounting of the belts may be achieved without disassembling any of the mechanism carried by the adjustable chute 14. It is only necessary to release the idler pulleys 172 from tensioning engagement with the belts 48, following which there is sufficient slack in the belts that the ends thereof which are supported by the outermost pulleys 58 may be removed from the periphery of said pulleys by moving the same transversely outward past the outermost side plate 66, for example, as viewed in FIGS. 14 and 15, whereupon the portion of the belt which extends around the opposite timing pulleys 56 on shaft 92 may similarly be moved transversely away from said pulleys and the side plates 60, passing said portions of the belts through the arcuate space 174 between the terminal end of outermost side plate 66 and the adjacent curved surface of arcuate swing plate 62. The space 174 is clearly shown in FIG. 8. By reversing the procedure, the belts may be mounted in operative position upon the supporting and driving timing pulleys 56 and 58, after which, the belts are tightened.

The connected strip 38 of inserts 54 initially is fed through the drag unit 40, wherein opposing wiping members 176 respectively slidably engage opposite sides of said strip, while suitable pairs of guide rollers 178 and 180 respectively engage opposite surfaces and the side edges of said strip of inserts to insure proper directing thereof upwardly past another guide roller 42 which primarily cooperates with the feed roller 44 to place the intervening section of the insert strip in suitable engagement with a nozzle 182 through which a narrow stream of suitable adhesive is continually delivered so as to dispose a narrow band thereof upon the outer surface of the strip of inserts. Said band of adhesive is applied to the strip a sufficient distance away from the adjacent outer edge of the strip that the musilage will not engage any of the guide means for the strip or detached inserts as the same move along the chute 14 and especially the guide channels 68 and 70 in the opposite side plates thereof.

The adhesive preferably is of the type which, at room temperature, is solid and in thread form, a supply thereof being held within container 184. One of such threads of adhesive extends upwardly through appropriate heater element 186 where the adhesive is rendered sufficiently fluid and tacky that, considering the speed at which the strip of inserts moves after having the narrow band of liquid adhesive applied thereto before it reaches and is applied to the printed web 16, one edge of the insert will be firmly attached by such adhesive to said web.

POWER MEANS AND TRANSMISSION

Referring to FIGS. 9–13, exemplary power and transmission means for driving particularly the feed roller shaft 76 and timing roller shaft 92 are illustrated. In FIGS. 9 and 10, the basic essentialls of the power means are shown, the same comprising an electric motor 188 having a pair of driving pulleys 190, 192 fixed to the shaft thereof and being of different diameters. The motor 188 may be suitably supported within a sub-housing 194 within housing 12. Supported on one wall of sub-housing 194 is a tachometer 198 and an electrical synchronizing unit 200. Tachometer 198 and synchronizing unit 200 each have gears 202 and 204 of equal size connected thereto and they both mesh with a single smaller gear 206 fixed to shaft 208 upon which a driven pulley 210 is fixed. A driving belt 212 extends around pulley 210 and motor pulley 190 to control the operation of motor 188 which is supplied power by a suitable circuit having a master switch, not shown.

When the master switch which controls operation of motor 188 is closed, the motor will revolve at a predetermined speed controlled by the tachometer 198 which is connected in circuit with another tachometer, not shown, of conventional nature, and embodied in the web driving mechanism of printing press or other web processing equipment so as to be responsive to the speed of the web therethrough. Accordingly, the speed at which the motor shaft 214 operates will be directly in desired proportion to the speed of the web, such as printed web 16 or otherwise, so as to deliver thereto at the same speed inserts which are to be attached at predetermined locations to said web by the mechanism comprising the present invention.

Driving pulley 192 on motor shaft 214 has a belt 222 extending therearound and also around driven pulley 228 which rotates idly on shaft 76. Pulley 232 is connected to pulley 232 for rotatable support upon shaft 76. A driven pulley 234 of appropriate diameter is fixed to timing pulley shaft 92. Belt 236 extends around the pulleys 232 and 234, whereby from the foregoing drive train, it will be seen that motor 188 drives shaft 92 at a desired speed corresponding to that of the web to which inserts are to be applied and such speeds being maintained identical by tachometer 198 and the corresponding tachometer in the web feeding mechanism.

Figure 12:
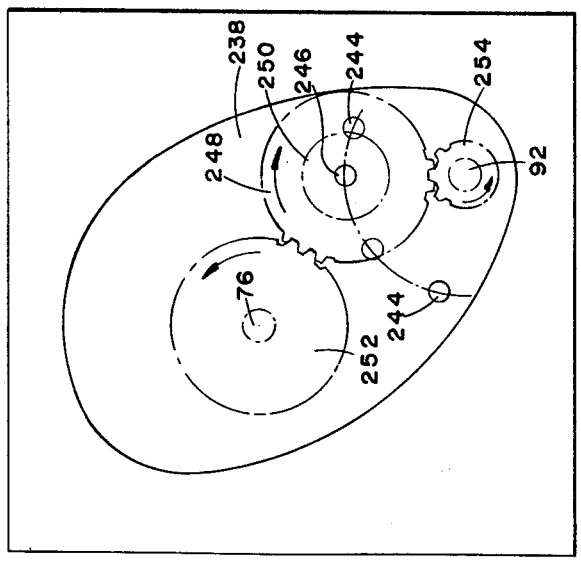
FIG. 12 is a fragmentary view similar to FIG. 11 but illustrating an alternate arrangement of said transmission gears to produce a different speed condition from that illustrated in FIG. 11.

The pinwheel shaft 76 is driven at a desired speed from timing pulley shaft 92 through the medium of a series of variable arrangements of a gear train, several exemplary arrangements thereof being illustrated in FIGS. 11 and 12, in plan view. An intermediate supporting plate 238, which is preferably similar in shape in plan view to swing plate 60, is supported for movement with said swing plate by a plurality of spacer bars 240, one of which is shown in FIG. 9 but the positions of all of which are shown in the axial directions thereof in FIG. 17. One end of each of said spacer bars 240 extends through suitable openings in the circular bearing plate 152, as shown in FIG. 17, and appropriate clearance notches 242 therefor are formed in the clamping ring 160, as also can be seen from FIG. 17. Hence, said one end of each of said spacer bars are fixed by suitable cap screws or the like to swing plate 60.

Figure 13:
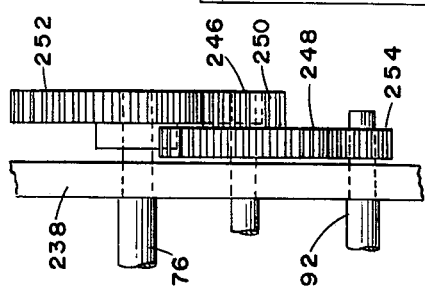
FIG. 13 is a fragmentary end view of the arrangement of gears shown in FIG. 12.

The pinwheel shaft 76 and timing pulley shaft 92 both extend through suitable openings in the intermediate supporting plate 238 for support of the aforementioned gear train upon relatively short end portions of said shafts which project through plate 238 as is best shown in FIG. 9. The intermediate supporting plate 238 also is provided in one surface thereof with an arcuate arrangement of similar tapped holes 244 which are for purposes of selectively receiving and suppoting a short stub shaft 246 upon which a connected pair of idler gears 248 and 250 of different diameters are rotatable. In the exemplary arrangement shown in FIG. 12, it will be seen that the stub shaft 246 supports the combined pair of idler gears 248 and 250 in a selected position in which only the gear 248 operates by meshing with gear 252 which is connected by keying or otherwise to pinwheel shaft 76. Gear 248 also meshes with the small pinion gear 254 which is fixed to time pulley shaft 92. An edge view of such arrangement is shown in FIG. 13. This arrangement of gear train will produce a certain speed at which the pinwheel shaft 76 will be driven, through said gear train, by the timing pulley shaft 92.

By changing the position of the stub shaft 246 and, for example, reversing the combination idler gears 248 and 250, it will be seen from the arrangement shown in FIG. 11 that a different speed ratio is achieved by meshing the small idler gear 250 with gear 252 and engaging the larger idler gear 248 with small pinion gear 254 on shaft 92 without changing the direction of rotation of the shaft 76. Limited axial movement of pinion gear 254 on shaft 92 will be required to achieve this. It will be understood that even though the interconnected pulleys 228 and 232 rotate as idlers upon shaft 76, independent rotation of shaft 76 may ocur by the drive means described immediately above while shaft 76 still serves as a support for the idlers 228 and 232. It also will be understood that many other possible arrangements of a driving gear train are possible to achieve whatever relative speed is required for the pinwheel shaft 76 which is driven by timing pulley shaft 92 but at various required speeds, according to the gear arrangements of the type shown in FIGS. 11 and 12, so as to effect desired speed of delivery of inserts at the discharge end of the chute 14. Tachometer 198 maintains the speed of delivery, once it is regulated, with that of the web, while electrical synchronizer unit 200 orients the delivery relative to the desired physical location upon the web so that delivery registers therewith after motor 188 is started.

The aforementioned difference in speeds between shafts 92 and 76 is necessary under circumstances where the linear spacing between attachment locations in the printed web vary between different webs such as at the end of a certain run of publication and before the commencing of a new run having a different spacing of locations for inserts to be attached thereto. Similarly, the length of the inserts for one particular job may and usually do vary with respect to inserts for another job. In view of this, the timing pulley shaft 92 will have to be operated at a different speed ratio with respect to the pinwheel shaft 76 as compared with a ratio between said shafts for a previous job. Hence, it will be seen that the driving mechanism is highly versatile and capable of many different speed ratios for the various moving parts and elements of the feeding, pulling and separating or severing mechanism carried by the adjustably positioned frame 14.

Power to operate the feeding mechanism for adhesive within the container 184 also is preferably derived from the transmission arrangement within housing 12. Referring to FIG. 9, it will be seen that a short jack shaft 256 is supported at spaced locations by a bearing block 258 connected to one wall of the housing 12, a bearing for the opposite end being contained within a suitable cover 260. Fixed to said shaft is a relatively large driven pulley 262 and a very small pinion gear 264 also is fixed to said shaft.

Drive shaft 266 which directly operates the adhesive-feeding mechanism also is supported within suitable bearings 268 and 270 and a driving gear 272 is fixed to shaft 266 and meshes with drive pinion 264. A relatively long belt 274 extends around the pulley 262 and at its upper end also extends around a drive pulley 276 fixed to the pinwheel shaft 76. Thus, the adhesive-feeding mechanism is driven by shaft 276 through the mechanism of the type described immediately above.

In all the foregoing descriptions relative to belts and pulleys, it is to be understood that the same are of the timing type, such as toothed pulleys having peripheries which are complementary to the inner surfaces of mating flexible toothed belts.

In the event the strip 36 of inserts should break, or when the end of a supply thereof is reached, the inserting attachment is stopped instantly. Details of mechanism to achieve this are best shown in FIG. 23, and also FIG. 22. It is simple in construction and foolproof in operation, consisting of a spring-pressed follower finger 278 supported on shaft 280 which extends to a switch box 282 connected in the power circuit to motor 188. As soon as a break or the end of the strip 36 of inserts reaches finger 278, it immediately drops from operative position to the phantom position shown in FIG. 22 with corresponding rotation of shaft 280 to open the switch in box 282, thereby stopping the inserting attachment. Such stopping may be signalled, if necessary, by audible or visible alarms, not shown, to summon an attendant to rectify the situation.

While the invention has been illustrated and described in its several preferred embodiments, it should be understood that the invention is not to be limited to the precise details herein illustrated and described since the same may be carried out in other ways falling within the scope of the invention as shown and described.

We claim:

1. Feeding and severing mechanism operable to receive a continuous strip of similar inserts formed from one or more thicknesses of sheet material and connected by weakening means extending transversely to said strip, said mechanism comprising in combination, means to feed a strip of said connected inserts at a predetermined speed, pulling means operable at a greater speed than said strip and positioned to engage the leading insert of said strip and place it under tension, stationary rupturing means comprising a relatively narrow and elongated blade extending longitudinally of the direction of feed of said strip and positioned to be slidably engaged by said strip with a minimum of impedence to the movement thereof while said strip is moving under tension and operable to initiate rupturing of the weakening means between said leading insert and the next succeeding insert and the tension imparted to said leading insert by said pulling means being adequate to continue said initial rupture instantly to complete the severance of said leading insert from the strip thereof and space it from the next succeeding insert, and discharge means receiving said severed inserts for discharge thereof from said mechanism.

2. The feeding and severing mechanism according to claim 1 in which said stationary rupturing blade is positioned intermediately of the side edges of the path of movement of said strip of pieces to be severed and perpendicular, whereby the initial rupturing of said weakening means between the leading insert and the next succeeding insert occurs intermediately of the side edges thereof and the rupturing of the entire weakening means occurs instantly outwardly in opposite directions toward the opposite ends of said weakening means.

3. The feeding and severing mechanism according to claim 2 in which said rupturing blade has an operable edge surface which slopes upwardly and forwardly relative to the path of movement of said strip and the trailing end thereof projects above the plane of movement of said strip of inserts and thereby causes an initial bursting of the weakening means in said strip of inserts intermediately of the ends of said weakening means.

4. The feeding and severing mechanism according to claim 3 in which said rupturing member is a narrow plate terminating at its trailing end in an acute angle having a relatively sharp apex engageable with the lower surface of said strip of inserts as the same moves along the path therefor.

5. The feeding and severing mechanism according to claim 3 in which said inserts of said strip are connected by transverse rows of incisions comprising said weakening means and said rupturing member is adjustably positionable longitudinally between said feeding and pulling means.

6. The feeding and severing mechanism according to claim 1 in which said pulling means also includes pushing means shaped and positioned to engage the trailing end of a separated leading insert and propel the same positively at said increased speed of said pulling means through said discharge means of said mechanism.

7. The feeding and severing mechanism according to claim 6 in which said pulling means comprises a pair of opposed pressure members respectively coengageable with the opposite surfaces of the leading insert of said strip thereof, one of said members having relieved surface portions spaced regularly therealong to provide intermittent engagement of said one pressure member with the other pressure member, thereby to permit the leading end portion of said leading insert of said strip thereof to advance between one of said relieved surface portions in said one pressure member and the opposing pressure member before being positively engaged between said pressure members to be pulled thereby and effect severance from said strip.

8. The feeding and severing mechanism according to claim 7 in which said pressure members are roller-like and said one of said pressure members which is provided with said relieved surface portions having non-relieved substantially cylindrical peripheral surface portions thereon to effect firm pressure engagement with the other pressure member to effect said positive pulling of said leading insert incident to effecting severance thereof from said strip of inserts.

9. The feeding and severing mechanism according to claim 8 in which said substantially cylindrical peripheral surface portions of said one of said pressure members are yieldable radially.

10. The feeding and severing mechanism according to claim 8 in which said one pressure member comprises an endless belt and said mechanism also includes spaced rollers around which said belt extends, said belt having successive thin and thickened portions on the outer surface thereof to comprise said relieved and nonrelieved surface portions of said one pressure member.

11. The feeding and severing mechanism according to claim 9 in which said belt pressure member also is provided with projections positioned thereon to engage the trailing ends of severed inserts and thereby being operable to positively push said separated inserts along and from the discharge means of said mechanism in accordance with desired precise timing of said delivery.

12. The feeding and severing mechanism according to claim 10 in which said other pressure member comprises a composite pressure roller assembly having opposite flattened sides comprising said relieved surface portions and mounted for rotation of the periphery of said non-relieved surface portions in pressure relationship with the thickened portions of said belt pressure member and at least one of said non-relieved surface portions of said pressure roller being yieldable radially and said flattened sides being positioned to accommodate said projections on said belt member as the pressure members move in operative engagement with each other.

13. The feeding and severing mechanism according to claim 11 in which said projections on said belt pressure member are positioned adjacent the trailing ends of said thickened portions of said belt member.

14. The feeding and severing mechanism according to claim 7 further including guide means spaced transversely in said mechanism and positioned respectively to receive the opposite side edges of said severed leading inserts to direct the movement of the same between said rupturing means and the discharge means of said mechanism.

15. The feeding and severing mechanism according to claim 14 further including propelling means movable within said mechanism and positioned to engage the trailing end of said separated leading inserts and propel the same positively along said guide means at a predetermined desired speed.

16. The feeding and severing mechanism according to claim 15 in which said propelling means comprise belt means having a course substantially coextensive with the length of said guide means.

17. The feeding and severing mechanism according to claim 14 in which said guide means extend longitudinally between said feed means and said discharge means of said mechanism to positively control the path of movement of said severed inserts through said mechanism and from the discharge means thereof.

18. The feeding and severing mechanism according to claim 6 in which said pulling means comprises a flexible endless member and drive means for the same operable at said greater speed than that of the feeding means by which said strip is fed to said mechanism, said pulling means and drive means having interengaging meshing means effecting positive and accurate driving of said pulling means by said drive means, thereby to effect desired timing of said pulling means.

19. The feeding and severing mechanism according to claim 18 in which said flexible endless member comprises a flexible friction belt and said interengaging meshing means comprising spaced teeth on the inner surface of said belt and complementary recesses on the periphery of said drive means to receive said teeth on said belt and thereby insure similar peripheral speed of said belt to that of the periphery of said drive means.

20. The feeding and severing mechanism according to claim 19 in which said drive means comprises a drive roller positively driven by said mechanism at a predetermined speed and said mechanism also including an idler roller spaced from said drive roller and said friction belt extending around said rollers for support thereby, and adjustable tensioning means for said belt engaging the inner surface of one course of the same between said rollers and operable to move said course outwardly from a straight line path thereof to provide desired tension in said belt and also to provide slack in said belt when disengaged therefrom to permit mounting of said belt around said rollers and removal therefrom when desired.

21. The feeding and severing mechanism according to claim 1 further including a housing, drive mechanism enclosed therein, a frame movably supported by said housing, said frame supporting said strip feeding, pulling, rupturing and discharge means, and means to arrange said frame at various adjusted positions relative to said housing to dispose said discharge means at a desired delivery position.

22. The feeding and severing mechanism according to claim 21 in which said frame is elongated and is pivotally connected adjacent one end to one wall of said housing selectively to dispose the opposite end of said frame in which the discharge means in mounted at a selected desired angular position with respect to said housing.

23. The feeding and severing mechanism according to claim 22 in which said frame comprises a pair of substantially parallel side plates, means spacing said plates transversely apart, and one of said side plates being adjacent said one wall of said housing, and means engaging said one side plate to clamp the same in desired adjusted position relative to said wall of said housing about the axis of said pivotal connection of said frame to said housing.

24. The feeding and severing mechanism according to claim 23 in which said side plates are provided with guide grooves extending longitudinally thereof and respectively engaging opposite side edges of said inserts to guide the movement thereof to the discharge end of said pulling means.

25. The feeding and severing mechanism according to claim 23 further including a plurality of shafts extending between said side plates of said frame, said shafts respectively supporting said feed means and pulling means for said strip of inserts, whereby a fixed relationship is maintained between said feed and pulling means.

26. The feeding and severing mechanism according to claim 25 in which said shafts comprise a pair of respectively positioned adjacent the opposite ends of said frame plates and each supporting a pulley around which a pair of parallel endless belts extend comprising said pulling means, tensioning idler roll means engaging one course of said belts between said supporting pulleys to move the same in a direction to tension said belts between said pulleys, and a clearance opening on said outer frame plate through which said belts may be passed to mount the same upon and dismount them from said pulleys when said tensioning idler roll means are disengaged from said belts.

27. The feeding and severing mechanism according to claim 25 in which an additional shaft of said plurality thereof supports feed roll means engageable with said strip of inserts to feed the same to said pulling means, said shaft being coaxial with the pivotal support for said frame and said frame maintaining all of said shafts and pulleys in fixed relationship relative to each other regardless of the selected angular operative position of said frame relative to said housing.

28. The feeding and severing mechanism according to claim 21 in which said drive means comprises an electric motor within said housing and a tachometer interconnected by drive means to said motor to control the speed thereof to regulate the delivery speed of separated inserts by said pulling means.

29. The feeding and severing mechanism according to claim 21 further including transmission means within said housing, an electric motor in said housing connected to said transmission means, and drive shafts interconnected to said transmission means and respectively connected to said pulling and feeding means for said inserts to drive the same at a desired speed ratio.

References Cited

UNITED STATES PATENTS

| | | | |
|---|---|---|---|
| 1,287,923 | 12/1918 | Dutro et al. | 225—100 |
| 1,810,403 | 6/1931 | Rupp | 225—100 |
| 2,639,772 | 5/1953 | Sandberg et al. | 225—100 X |
| 2,778,424 | 1/1957 | Hageman et al. | 225—100 X |
| 2,862,554 | 12/1958 | Davidson et al. | 225—100 |
| 3,057,527 | 10/1962 | Hannon | 225—100 |
| 3,425,607 | 2/1969 | Sargent | 225—100 |

JAMES M. MEISTER, Primary Examiner

U.S. Cl. X.R.

225—100